Figure 1:
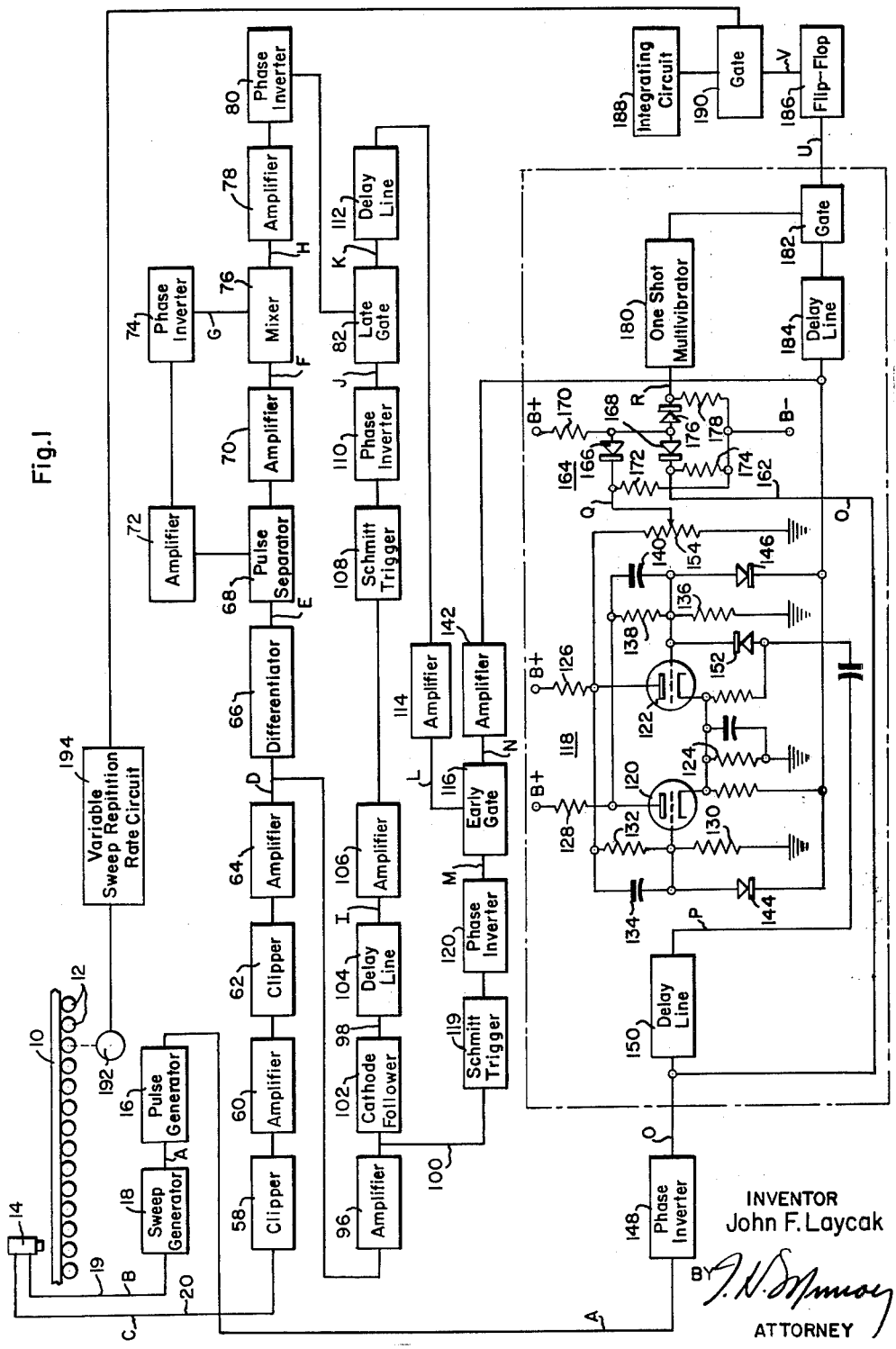

Jan. 30, 1962  J. F. LAYCAK  3,019,347
ELECTRONIC SURFACE INSPECTION SYSTEM
Filed Nov. 23, 1959  2 Sheets-Sheet 2

INVENTOR
John F. Laycak
BY
ATTORNEY

United States Patent Office 3,019,347
Patented Jan. 30, 1962

3,019,347
ELECTRONIC SURFACE INSPECTION SYSTEM
John F. Laycak, Duquesne, Pa., assignor to Jones & Laughlin Steel Corporation, Pittsburgh, Pa., a corporation of Pennsylvania
Filed Nov. 23, 1959, Ser. No. 854,852
10 Claims. (Cl. 250—223)

This invention relates to apparatus for detecting defects on the surface of a body, and more particularly to a surface inspection system utilizing an electron-optics device for electronically scanning the image of the surface of a body to produce an electrical signal indicative of the surface condition of the body being scanned.

Although not limited thereto, the present invention is particularly adapted for use in a surface inspection system of the type described in copending application Serial No. 827,315, filed July 15, 1959, and assigned to the assignee of the present application. In a system of the type described in the aforesaid application, a photosensitive device such as a vidicon is positioned above a body as it travels along a conveyor and is utilized to scan the image of the surface of the body along a line extending substantially perpendicular to the direction of movement of the body. If the body happens to be a hot steel slab, for example, the electron beam of the photosensitive device will produce a video signal in which a relatively long pulse is produced for each scan of the electron beam, this pulse being produced as the beam scans across the image of the irradiant surface of the body. Superimposed on this long pulse are positive or negative short pulses which arise when the electron beam scans over the image of a defect, the width of each pulse being proportional to the width of the defect it represents. In this manner, a positive pulse is produced when the beam scans over a defect image having a greater light intensity than the remainder of the surface, while a negative pulse is produced by a defect image having a lower light intensity. If the body being inspected is not irradiant, it may be illuminated by external means with the same result just so long as the defects appear brighter or darker than the background surrounding them.

Since the widths of the various defect pulses produced in the video signal are proportional to the widths of the flaws they represent, and since the slab moves in a direction perpendicular to the path of the electron beam of the vidicon, the various pulses may be integrated to determine the total defect area along a predetermined length of the body being inspected. Before integration can be performed, however, the aforesaid relatively long pulses on which the defect pulses are superimposed must be eliminated from the wave shape, and all of the defect pulses must be converted to one polarity. In order to do this, the original signal must be differentiated to produce voltage spikes at the leading and trailing edge of each pulse in the signal. All of the voltage spikes except those due to the leading and trailing edges of defect pulses are first eliminated and the remaining spikes may be applied to a bistable multivibrator or flip-flop circuit where the defect pulses are reformed with the same time sequence and the same width as the original defect pulses. As will be understood, two voltage spikes are required for each original defect pulse in order for the flip-flop circuit to switch from one stable state to the other and then back to its original state to produce an ouput pulse. If all of the defects appearing on the surface of the body have a substantial width, the original pulses will be reformed in the manner described above. In certain cases, however, the defect is so narrow that only a single voltage spike is produced by the differentiator rather than a pair of spikes at its leading and trailing edges. When this single spike is fed to the flip-flop circuit, it appears as the leading edge of a pulse, and the next successive spike, which occurs at the leading edge of the next defect, appears as the trailing edge of a pulse to the flip-flop circuit. Consequently, the output of the circuit is no longer a true reproduction of the original defect pulses, and if this output is fed to an integrator, the defect area indicated will be erroneous.

The present invention has as its principal object the provision of means in a system of the type described above for minimizing errors due to extremely narrow defects which produce a single differentiated voltage spike rather than two.

More generally, an object of the invention resides in the provision of means, in a system adapted to produce an odd or even number of voltage spikes during successive time intervals, for eliminating the groups having an odd number of spikes therein. As will become apparent from the following description, an odd number of voltage spikes will ordinarily be produced by differentiation when an extremely narrow defect is scanned by the electron beam of the vidicon. By eliminating all of the differentiated spikes occurring during a sweep of the electron beam when an extremely narrow defect appears, the erroneous area measurements obtained can be minimized.

Figure 2:
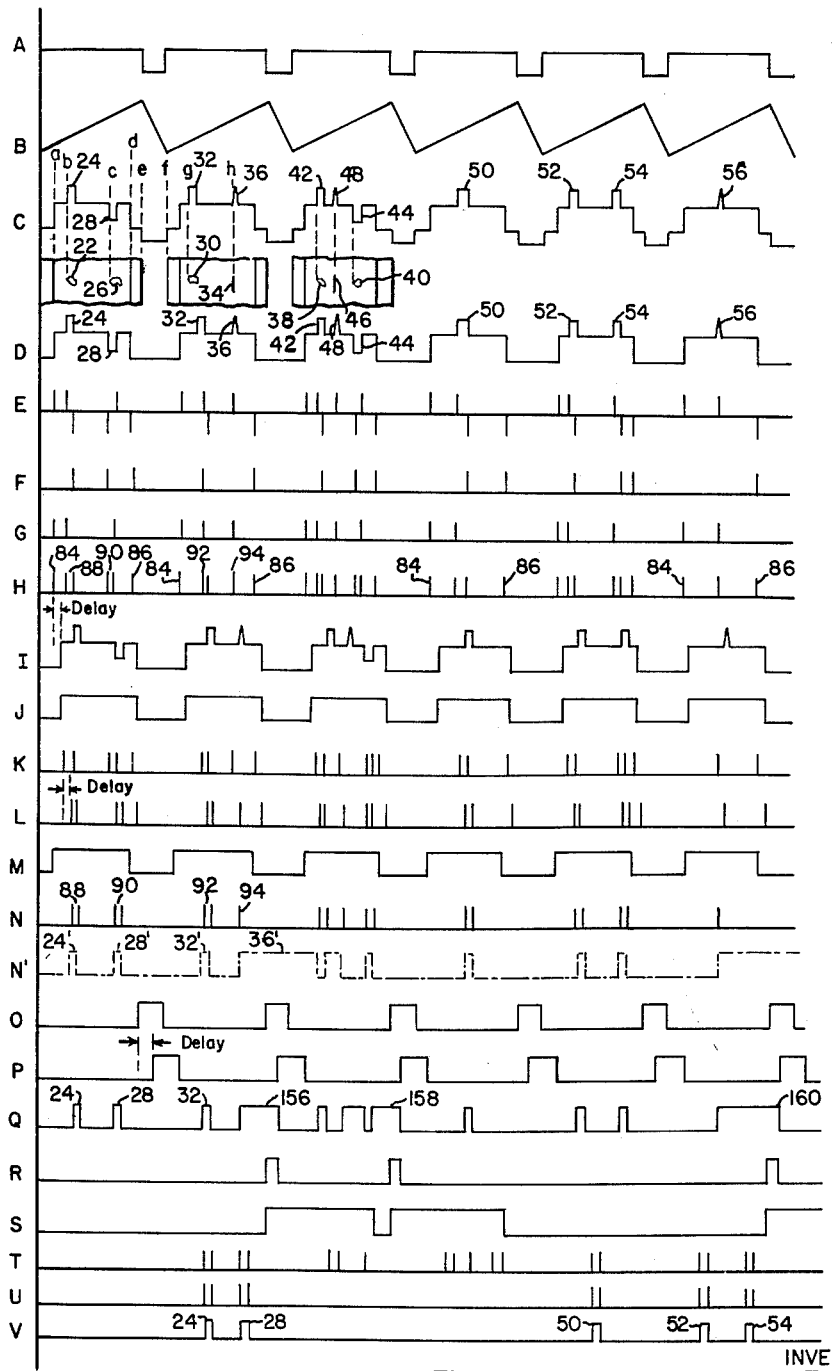

The above and other objects and features of the invention will become apparent from the following detailed description taken in connection with the accompanying drawings which form a part of this specification and in which:

FIGURE 1 is an overall schematic diagram of a surface inspection system incorporating the present invention; and FIGURE 2 is an illustration of wave forms appearing at various points in the circuit of FIG. 1.

In FIG. 1, the present invention per se is enclosed by broken lines, the remainder of the circuitry being a part of, and fully described in, the aforesaid application Serial No. 827,315. The various details of the circuits shown herein in block form may be had by reference to that application.

Referring now to FIG. 1 in detail, a hot, irradiant steel slab 10 is illustrated as passing over a series of conveyor rolls 12. Above the slab is a vidicon tube 14 adapted to scan over a single fixed line which extends substantially perpendicular to the direction of movement of the slab 10. As was explained above, defects on the surface of the slab 10 will appear brighter or darker than the background surrounding them. Consequently, as the electron beam of the vidicon 14 sweeps across the width of the slab, a pulse will be produced in its video output wave form each time a defect is intercepted by the electron beam.

The electron beam of vidicon 14 is actuated to sweep across an image of the width of the slab 10 by circuitry including a pulse generator 16. The output of this pulse generator appears as wave form A in FIG. 2 and comprises a series of elongated pulses of equal width. These pulses are fed to a sweep generator or camera control circuit 18 which will produce the sawtooth wave form B shown in FIG. 2. This wave form is essentially a series of rising current excursions which cause the electron beam of the vidicon 14 to sweep across the surface of the slab and then return to its initial position during a dwell time when the wave form B returns to its initial current level. It will be noted that the length of each rising current excursion in wave form B is equal to the width of a pulse in wave form A. The wave form B is fed to the vidicon 14 through lead 19 while the video wave form, illustrated as wave form C in FIG. 2, appears on lead 20. For illustrative purposes, each successive cycle of the video wave form C represents a different condition of the slab surface. In actual practice, however, each one of the cycles illustrated in wave form C will persist during a number of sweeps of the electron beam of the vidicon since it will take a certain amount of time for the electron beam to scan the entirety of any set of defects. It should be understood, therefore, that an actual video signal appearing at the output of vidicon 14 would not appear exactly as wave form C which is included herein only to illustrate various wave shapes that may be produced.

The video wave form C is a series of relatively long pulses having superimposed thereon short pulses indicating the presence of defects. Thus, it will be apparent from FIG. 2 that as the electron beam sweeps from one side of the conveyor 12 to the other, it will first scan the dark background portion of the conveyor until it reaches point $a$ which is the edge of the irradiant slab 10. After intersecting the edge of the slab, the voltage of the video wave form increases because of the greater light intensity of the slab. At point $b$ the electron beam intersects a defect 22 having a greater light intensity than the remainder of the slab. Consequently, a positive pulse 24 is produced in the wave form. At point $c$ the electron beam again intersects a defect 26, but in this case the defect has a lesser light intensity than the remainder of the slab; and, consequently, a negative short pulse 28 is produced in the wave form. Finally, at point $d$ in the wave form the electron beam leaves the edge of the slab, and the voltage decreases due to the dark background of the conveyor. Between points $e$ and $f$ the electron beam returns to its original starting position over a very short interval of time, and the cycle is repeated.

In the second cycle which illustrates a different condition of the slab, the electron beam again intersects a defect 30 having a greater light intensity than the remainder of the slab at point $g$. Consequently, a positive pulse 32 is produced in the wave form. At point $h$ the electron beam intersects a very narrow defect 34 which has a greater light intensity than the remainder of the slab. Consequently, a very short positive spiked pulse 36 is produced in the wave form. In the third cycle of operation the electron beam again intersects defects 38 and 40 which have greater and lesser light intensities, respectively, than the remainder of the slab. Consequently, a positive pulse 42 is produced by defect 38 and the negative pulse 44 by defect 40. Between the defects 38 and 40, however, is a very narrow defect 46 which is brighter than the remainder of the slab. Consequently, a spiked positive pulse 48 is produced between pulses 42 and 44. In the fourth cycle of operation a single defect having a greater light intensity than the remainder of the slab produces a positive pulse 50; in the fifth cycle of operation two defects which are brighter than the remainder of the slab produce pulses 52 and 54; and in the sixth cycle of operation a very narrow defect which is brighter than the remainder of the slab produces the single sharp or spiked positive pulse 56.

Turning again to FIG. 1, from lead 20 the wave form C is passed through a first clipper 58 and amplifier 60 to a second clipper 62 and a second amplifier 64. The function of the first clipper 58 is to remove the lower portion of the video wave form C so that only the pulse between points $a$ and $d$ remains. Circuit 60 amplifies the wave form, and clipper 62 further refines the clipping action so as to insure that clean pulses of high amplitude appear at the output of amplifier 64. These pulses, then, appear as wave form D in FIG. 2. This wave form is passed through a differentiator 66 which produces a sharp spiked pulse of positive polarity whenever the input wave form D changes in a positive direction and a sharp spiked pulse of negative polarity whenever the input signal level changes in a negative direction. The output of the differentiator 66 thus appears as wave form E in FIG. 2. It will be noted that each of the pulses in wave form D, with the exception of very narrow pulses 36, 48 and 56, will produce a sharp positive spiked pulse at its leading edge and a sharp negative spiked pulse at its trailing edge. The very narrow pulses 36, 48 and 56, however, produce only a single positive spiked pulse at the output of the differentiator. Wave form E at the output of differentiator 66 is fed to a pulse separation circuit 68 which separates the positive pulses in wave form E from the negative pulses. The negative spiked pulses are fed through amplifier 70 wherein they are inverted to appear as the positive pulses in wave form F of FIG. 2. In a similar manner, the positive spiked pulses from separation circuit 68 are fed through amplifier 72 and phase inverter 74 such that the pulses in wave form G appearing at the output of the phase inverter correspond to the original positive spiked pulses in wave form E. The spiked pulses in wave forms F and G are then fed to a mixer 76 where they are combined to produce a series of positive spiked pulses appearing as wave form H in FIG. 2. The net effect of circuits 68—76, therefore, is to convert all of the spiked pulses in wave form E to one polarity. These spiked pulses are then passed through amplifier 78 and phase inverter 80 to a late gate circuit 82.

From an examination of wave form H in FIG. 2 it will be seen that spiked pulse 84 corresponds to the leading edge of the pulse produced at point $a$ when the electron beam strikes the edge of the slab, while spiked pulse 86 is that produced when the electron beam intersects the other edge of the slab at point $d$. The pair of spiked pulses identified as 88, however, correspond to the leading and trailing edges of the pulse 24 produced by defect 22; while the pulses identified by the numeral 90 correspond to the leading and trailing edges of the pulse 28 produced by defect 26. In the second cycle of operation, the pair of spiked pulses 92 correspond to the leading and trailing edges of pulse 32; whereas the single spiked pulse 94 corresponds to the very narrow defect pulse 36 in the original video wave form C. It is desired to integrate only the distances between the various spiked pulses originating at the leading and trailing edges of pulses produced in the original video wave form by defects. Consequently, the pulses 84 and 86 which occur during each cycle of operation must be eliminated.

To this end, circuitry is provided including an amplifier 96 (FIG. 1) to which wave form D from amplifier 64 is fed. The output from amplifier 96 is divided into two channels 98 and 100. Channel 98 includes a cathode follower 102, a delay line 104, amplifier 106, Schmitt trigger circuit 108, and phase inverter 110. After passing through circuit 104, the video wave form is delayed and appears as wave form I in FIG. 2. The delayed wave form, after passing through amplifier 106, is used to trigger the multivibrator or Schmitt trigger circuit 108 so that the output of phase inverter 110 appears as wave form J which is a series of pulses all having a width proportional to the width of the slab 10, but delayed with respect to the original video wave form. The wave form J is then passed to the late gate circuit 82 along with wave form H from phase inverter 80. Late gate circuit 82 will produce an output signal when, and only when, there is coincidence of pulses in wave form H with those in wave form J. From an inspection of these wave forms in FIG. 2, it will be seen that they coincide to pass all pulses except pulse 84 due to the leading edge of the pulse produced between points $a$ and $d$ in wave form C. The delay imparted by delay line 104 is just enough to eliminate this pulse and, of course, should be kept as small as possible so as not to eliminate any defect pulses which might occur very close to the edge of the slab.

With the spiked pulse 84 removed for each cycle of operation, the output from late gate circuit 82 appears as wave form K in FIG. 2. This wave form is passed through a second delay line 112 and amplifier 114 to an early gate circuit 116. The delayed wave form L appearing at the early gate 116 is as shown in FIG. 2 wherein all of the original spiked pulses in wave form H except pulse 84 remain.

The output of amplifier 96 is fed through a Schmitt trigger multivibrator 119 in channel 100 which produces wave form M at the output of phase inverter 120. The wave form M and wave form L from amplifier 114 are fed to the early gate circuit 116 which functions in a manner similar to gate 82 in that it will pass output signals only upon coincidence of a pulse in wave form M with one in wave form L. It can be seen from FIG. 2 that since wave form L has been delayed while wave form M has not, the spiked pulses 86 extend beyond the trailing edges of the pulses in wave form M and, therefore, do not appear at the output of early gate 116. The wave form N at the output of early gate 116 will, therefore, be only the spiked pulses produced by defect pulses in the original video wave form C.

Since it is desired to integrate the widths of the various defect pulses in the original video wave form C, these defect pulses must be reformed from the spiked pulses in wave form N which were produced in the differentiation process. The defect pulses may be readily reformed in the case of the first cycle by merely passing the wave form N through a bistable multivibrator or flip-flop circuit. If the wave form N were simply passed through a flip-flop circuit, the wave form N′ would result where, for the first cycle of operation, the reformed pulses 24′ and 28′ would result. As is well known to those skilled in the art, a flip-flop circuit will produce an output pulse only in response to the two input pulses. Since there are two voltage spikes in wave form N for each of the defect pulses 24 and 28, these pulses may be readily reformed as shown in wave form N′. In the second cycle of operation, it will be remembered a very narrow defect pulse 36 produced only a single spike 94. Consequently, although the defect pulse 32 will be reformed by spikes 92 as pulse 32′, the spike 94 will appear as the leading edge of a pulse to the flip-flop circuit while the spike due to the leading edge of the defect pulse 42 in the next cycle of operation will appear as the trailing edge of a pulse. Consequently, a very long pulse 36′ will be produced by the flip-flop circuit. The spiked pulse in wave form N due to the trailing edge of original defect pulse 42 will then appear to the flip-flop circuit as the leading edge of a pulse rather than as a trailing edge; and the single spiked pulse produced by the very narrow defect pulse 48 will appear as a trailing edge for this pulse. It can be readily seen, therefore, that when an odd number of spikes occur in wave form N during a sweep of the electron beam of the vidicon, a simple bistable multivibrator or flip-flop circuit cannot reconstruct or reform the defect pulses. The defect pulses are, however, accurately reformed when an even number of spiked pulses appear in wave form N as in the first, fourth and fifth cycles shown in FIG. 2. If the wave form N′ were fed to integrating circuitry, the resulting integrated output would obviously not be a true indication of the total defect area.

The present invention per se comprises means for eliminating the odd-numbered groups of spiked pulses in wave form N occurring during a sweep of the electron beam of vidicon 14. This means includes a multivibrator flip-flop circuit, generally indicated at 118 in FIG. 1. The flip-flop circuit comprises two triodes 120 and 122 having their cathodes connected to ground through a single cathode resistor 124. The plate of tube 122 is connected to a B+ voltage source through resistor 126; whereas the plate of tube 120 is connected to the same source of voltage through resistor 128. The grid of tube 120 is connected to ground through resistor 130 and to the B+ voltage source through resistors 132 and 126, with resistor 132 being bypassed by capacitor 134. In a similar manner, the grid of tube 122 is connected to ground through resistor 136 and to the B+ voltage source through resistors 138 and 128, with resistor 138 being bypassed by capacitor 140. It should be noted that the plate of triode 120 is connected to the grid of triode 122 through resistor 138 and capacitor 140. Likewise, the plate of triode 122 is connected to the grid of triode 120 through resistor 132 and capacitor 134.

When a source of anode voltage is applied to the flip-flop circuit, current will tend to flow in the plate circuits of triodes 120 and 122. If the two halves of the circuit are identical, the tube currents will be nearly equal at first. However, a perfect balance is always impossible; and means are provided to insure that triode 122 initially conducts more heavily than triode 120. Increased current in triode 122 causes an increase in the voltage drop across resistor 126, and, thus, a decrease in the plate voltage of tube 122. Because of the connection between the plate of triode 122 and the grid of triode 120, the decrease in the plate voltage of triode 122 is accompanied by a decrease in the grid voltage of triode 120. Therefore, an increase in the plate current of tube 122 must be accompanied by a decrease in the plate current of tube 120 since its grid is now driven negatively. Moreover, the decrease of the plate current through tube 120 causes an increase of the grid voltage of triode 122; and, consequently, results in a further increase of plate current through triode 122. In this manner, a slight initial unbalance sets up a cumulative or regenerative switching action which reduces the plate current of tube 120 to zero and increases the plate current of tube 122 to a maximum. Although described as if it occurred slowly, this action occurs with extreme rapidity—in a fraction of a microsecond in most flip-flop circuits.

The spiked pulses in wave form N at the output of early gate 116 are applied through amplifier 142 and diodes 144 and 146 to the grids of triodes 120 and 122. In addition, the output of pulse generator 16 appearing as wave form A in FIG. 2 is passed through phase inverter 148 to produce wave form O. This wave form is passed through delay line 150 and diode 152 to the grid of the normally conducting triode 122 in flip-flop circuit 118. Since triode 122 is initially conducting, the pulses from amplifier 142, which are now negative, cut off this triode (i.e. triode 122). This causes a regenerative switching action in which, while triode 122 cuts off, triode 120 conducts. Furthermore, triode 120 will continue to conduct until the next pulse is received in wave form N. Since the plate voltage of triode 122 will rise when it is cut off, and since this triode is cut off between successive pairs of pulses in the wave form N, the output of the flip-flop circuit appearing across resistor 154 will be wave form Q of FIG. 2 where, in the first cycle of operation, the two original pulses 24 and 28 are reformed between their respective spikes identified by the numerals 88 and 90. It will be noted that after the pulses 24 and 28 are reformed, the first pulse in wave form P from delay line 150 is applied to the grid of triode 122. This pulse has a positive polarity but, since the triode 122 is already conducting after having reformed the pulse 28, it has no effect on the operation of the circuit. In the next cycle of operation, the spiked pulses in wave form N identified by the numeral 92 will reform the original defect pulse 32. That is, when the first of the spikes 92 is applied to the flip-flop circuit, triode 122 will cut off and triode 120 will conduct whereby the plate voltage of triode 122 will rise. When the second of the spikes 92 is applied to the circuit, however, the triode 120 will cut off while triode 122 again conducts with the result that its plate voltage falls to reform the pulse 32. The next spiked pulse received by the multivibrator will be that identified by the numeral 94 which is due to the extremely narrow defect 34. Thus, when spike 94 is received by the flip-flop circuit, triode 122 will cut off and its plate voltage will rise while triode 120 begins conduction. Since there is no spiked pulse in wave form N for the trailing edge of pulse 36 produced by defect 34, triode 122 will continue to conduct until the next or second pulse in wave form P is applied to its grid through diode 152. When this second pulse is applied, the triode 122 again conducts as its plate voltage drops to form the pulse 156 in wave form Q. It will be noted from an examination of wave form Q that the pulse from delay line 150 affects operation of the flip-flop circuit 118 only when there are an odd number of voltage spikes produced during a sweep of the electron beam as in the second, third and fifth cycles of operation. Furthermore, the last pulse produced in wave form Q during a sweep of the electron beam when an odd number of spikes appear in wave form N overlaps a pulse in wave form O at the output of phase inverter 148. Thus, each of the pulses 156, 158 and 160 overlaps a pulse in wave form O while none of the other pulses in wave form Q overlap the pulses in wave form O. By comparing wave form O on lead 162 with wave form Q which appears across resistor 154 in a comparator circuit, generally indicated at 164, the wave form R will be produced. It will be noted that the pulses in wave form R are generated when, and only when, there is coincidence of a pulse in wave form Q with a pulse in wave form O.

The comparator 164 comprises a pair of diodes 166 and 168 having their anodes connected through resistor 170 to a B+ voltage source, and their cathodes connected through resistors 172 and 174, respectively, to a source of B− voltage. Also included in the circuit is a third diode 176 having its cathode connected to the B− source through resistor 178. The anode of diode 176 is connected as shown to the anodes of diodes 166 and 168 as well as the B+ voltage source through resistor 170. In operation, a portion of the current between the B+ and B− sources will normally flow through diode 176; however, a large part of that current will be shunted through diodes 166 and 168. Consequently, the voltage level at the cathode of diode 176 will be relatively low. When a pulse in wave form Q appears across resistor 154, diode 166 will be biased to cut off, and the voltage at the cathode of diode 176 will rise in the positive direction, but not enough to trigger the one-shot or monostable multivibrator 180. Similarly, a pulse in wave form O on lead 162 will bias diode 168 to cut off, but the voltage at the cathode of diode 176 will again not rise to the firing level of circuit 180. The pulses in wave form R which have sufficient amplitude to trigger the multivibrator 180 will be produced only when both diodes 166 and 168 are cut off, and this occurs only upon coincidence of a pulse in wave form O with a pulse in wave form Q. It is to be understood that the invention is not limited to the particular coincidence circuit shown herein. Coincidence may be alternatively achieved, for example, by applying the wave forms O and R to two grids in a vacuum tube and by adjusting the threshold level of the tube whereby it will conduct only upon the presence of a pulse on each of the grids.

When the output of coincidence circuit 164 is applied to the one-shot multivibrator 180, it will produce a pulse of fixed length each time a pulse appears in wave form R at the output of circuit 164. The one-shot multivibrator 180 is adjusted whereby the length of the pulses produced at its output (i.e., wave form S) is approximately equal to the distance betwene the points *a* and *f* in wave form C. Wave form S at the output of multivibrator 180 is then passed to gate circuit 182 as a gating signal. The spiked pulses in wave form N at the output of amplifier 142 are, in addition to being applied to the grids of triodes 120 and 122 in multivibrator 118, passed through delay line 184 to the gate circuit 182. The delay imparted by delay line 184 is just enough to shift the wave form N to the right by one cycle. That is, it is shifted to the right by an amount equal to the aforesaid distance between points *a* and *f* in wave form C. Consequently, the output of the delay line 184 appears as wave form T. It will be noted that the groups of odd numbered spiked pulses which are produced by extremely narrow defects appear below or coincide with the pulses in wave form S. Therefore, by gating wave form T with wave form S in gate circuit 182, all of the odd-numbered groups of spiked pulses in wave form N will be eliminated, and the resulting signal at the output of the gate circuit 182 will appear as wave form U where only even-numbered groups of pulses remain. These pulses may then be fed to a flip-flop circuit 186 which is identical to the flip-flop circuit 118 already described except that no reset pulses are applied to the normally conducting tube as they are in the case of circuit 118. The output of the flip-flop circuit, therefore, will be wave form V in which the pulses 24, 28, 50, 52 and 54 have been reformed. All of the pulses which occur during a cycle of operation when a very narrow defect is scanned, however, are eliminated. This, of course, introduces an error when the pulses in wave form V are integrated to determine the total defect area. The error introduced, however, is not nearly as large as it would be if wave form N', for example, were passed to the integrator.

Before wave form V is passed to the integrating circuit identified by the numeral 188 in FIG. 1, it passes through a gate circuit 190. Since the electron beam of the vidicon 14 scans along a fixed line at constant sweep frequency in the embodiment shown herein, the total number of defect pulses in wave form V produced for any given length of the body will be a function of its speed. That is, if the body travels along its conveyor 12 at a high rate of speed, a fewer number of defect pulses will be produced in wave form V during one foot of travel than would be produced for the same foot of travel if the speed of the body were decreased. Since it is desired to integrate the widths of the defect pulses over a given length of the body, and since the number of these pulses is dependent upon the speed of the body, some means must be provided to insure that the number of defect pulses fed to the integrating circuitry 188 will be the same for a particular length of the slab 10 regardless of its speed. Otherwise, the output of the integrating circuitry will not be a true indication of the total defect area. Consequently, the speed of the slab 10 is measured by a tachometer generator 192 which is mechanically connected to the conveyor 12. The sine wave output of the tachometer generator is then fed to a variable sweep repetition rate circuit 194 which is fully described in the aforesaid copending application Serial No. 827,315. The circuit 194 will produce a train of output pulses having a fixed pulse width, but a pulse repetition frequency dependent upon the sine wave frequency of tachometer generator 78 which, in turn, is dependent upon the speed of the slab 10. Thus, the number of pulses fed to gate 190 will increase as the speed of the slab 10 increases. Similarly, the number of pulses in wave form V passed through gate circuit 190 to the integrating circuit will also increase as speed increases whereby the number of defect pulses reaching the integrating circuitry will always be the same for a given length of the slab regardless of its speed.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a system adapted to produce an odd or even number of voltage spikes during successive equal time intervals, apparatus for eliminating the groups having an odd number of spikes therein comprising, in combination, means for producing a first train of voltage pulses in which a pulse is produced during each of said equal time intervals with the leading edge of the pulse coinciding with the beginning of the time interval, means for delaying said first train of pulses by a predetermined amount, a device for producing pulses between successive pairs of the spikes in each of said groups and between the last odd-numbered spike in said odd-numbered groups and the leading edge of the following pulse in said delayed first train of pulses, means for comparing the undelayed first train of pulses with the pulses produced by said device to thereby produce a second train of pulses in which a pulse occurs upon coincidence of a pulse in said first train with a pulse produced by said device, circuit means for increasing the length of the pulses in said second train, means for delaying said voltage spikes by an amount substantially equal to that of said equal time intervals, and apparatus for gating the delayed voltage spikes with said pulses of increased length.

2. In a system adapted to produce an odd or even number of voltage spikes during successive equal time intervals, apparatus for eliminating the groups having an odd number of spikes therein comprising, in combination, means for producing a first train of pulses in which a pulse is produced during each of said equal time intervals, means for delaying said first train of pulses by a predetermined amount, a device for producing pulses between successive pairs of the spikes in each of said groups and between the last odd-numbered spike in said odd-numbered groups and the leading edge of the following pulse in said delayed first train of pulses, means for comparing the undelayed first train of pulses with the pulses produced by said device to thereby produce a second train of pulses in which a pulse occurs upon coincidence of a pulse in said first train with a pulse produced by said device, circuit means for increasing the length of the pulses in said second train, means for delaying said voltage spikes, and apparatus for gating the delayed voltage spikes with said pulses of increased length.

3. In a system adapted to produce an odd or even number of voltage spikes during successive equal time intervals, apparatus for eliminating the groups having an odd number of spikes therein comprising, in combination, means for producing a first train of voltage pulses in which a pulse is produced during each of said equal time intervals with the leading edge of the pulse coinciding with the beginning of the time interval, means for delaying said first train of pulses by a predetermined amount, a bistable circuit having two electron valves therein and arranged whereby one valve will conduct while the other is cut off and vice versa, one of said valves being normally conducting while the other valve is normally nonconducting, control electrodes for each of said valves, connections for applying said voltage spikes to the control electrodes of each of said valves, connections for applying said delayed first train of pulses to the control electrode of said normally conducting valve, means for comparing the output from said normally conducting valve with said undelayed first train of pulses whereby a second train of pulses will be produced in which a pulse occurs only upon coincidence of a pulse at the output of said normally conducting valve with a pulse in said undelayed first train of pulses, circuit means for increasing the length of the pulses in said second train, means for delaying said voltage spikes by an amount substantially equal to that of said equal time intervals, and apparatus for gating the delayed voltage spikes with said pulses of increased length.

4. In a system adapted to produce an odd or even number of voltage spikes during successive equal time intervals, apparatus for eliminating the groups having an odd number of spikes therein comprising, in combination, means for producing a first train of voltage pulses in which a pulse is produced during each of said equal time intervals with the leading edge of the pulse coinciding with the beginning of the time interval, means for delaying said first train of pulses by a predetermined amount, a bistable flip-flop circuit, connections for applying said voltage spikes to said flip-flop circuit to switch it from one stable state to the other, connections for applying said delayed first train of voltage pulses to said flip-flop circuit whereby a pulse in said first train will switch the flip-flop circuit to one of its two stable states if the circuit is in its other stable state at the time the pulse is applied, means for comparing the output of said flip-flop circuit with said undelayed first train of pulses to produce a second train of pulses in which a pulse occurs only upon coincidence of a pulse at the output of said flip-flop circuit with a pulse in said undelayed first train of pulses, means for lengthening the pulses in said second train of pulses, means for delaying said voltage spikes by an amount substantially equal to said equal time intervals, and means for gating the delayed voltage spikes with the lengthened second train of pulses.

5. In a system adapted to produce an odd or even number of voltage spikes during successive equal time intervals, apparatus for eliminating the groups having an odd number of spikes therein comprising, in combination, means for producing a first train of voltage pulses in which a pulse is produced during each of said equal time intervals with the leading edge of the pulse coinciding with the beginning of the time interval, a bistable flip-flop circuit having two electron valves therein, control electrodes for each of said electron valves, connections for applying said voltage spikes to each of said control electrodes, means including a delay line connecting said first train of voltage pulses to a single one of said control electrodes, a circuit for comparing the output of said flip-flop circuit with said first train of voltage pulses to produce a second train of voltage pulses in which a pulse is produced only upon coincidence with a pulse at the output of said flip-flop circuit with a pulse in said first train of pulses, means for lengthening the pulses in said second train of pulses, a gating circuit, connections for applying said lengthened pulses in the second train to the gating circuit as a gating signal, and means including a delay line connecting said voltage spikes to said gating circuit as a signal which is to be gated.

6. In a surface inspection system for material in which flaws have a different optical appearance than the remainder of the material, the combination of an electron-optics device for scanning an image of the surface of said material with an electron beam to produce a video signal in which a voltage pulse is generated each time the electron beam scans over the image of a flaw on said material, means including a pulse generator for causing said electron beam to sweep across the image of said material each time a pulse is produced by the generator, means responsive to said video signal for producing a differentiated signal in which a pair of spiked pulses are produced at the leading and trailing edges of pulses of substantial width in the video signal and a single spiked pulse is produced by a very narrow pulse in the video signal, a bistable flip-flop circuit having a normally conducting electron valve therein as well as a normally nonconducting valve, control electrodes for each of said valves, connections for applying said differentiated signal to each of said control electrodes, means including a delay line coupling the output of said pulse generator to the control electrode of said normally conducting valve, means for comparing the output of said pulse generator with the output of said normally conducting valve to produce a train of pulses in which a pulse is produced upon coincidence of a pulse from said pulse generator with a pulse from said normally conducting valve, means for lengthening the pulses in said train of pulses, means for delaying said differentiated pulses by an amount substantially equal to the time duration between successive pulses at the output of said pulse generator, means for gating the delayed integrated pulses with said train of lengthened pulses to eliminate all differentiated pulses occurring during a sweep of the electron beam when a very narrow pulse appears in the video signal, and means responsive to the output of said gating means for producing a pulse between successive pairs of spikes in the gated differentiated signal.

7. In a surface inspection system for material in which flaws have a different optical appearance than the remainder of the material, the combination of an electron-optics device for scanning an image of the surface of said material with an electron beam to produce a video signal in which a voltage pulse is generated each time the electron beam scans over the image of a flaw on said material, means including a pulse generator for causing said electron beam to sweep across the image of said material each time a pulse is produced by the generator, means responsive to said video signal for producing a differentiated signal in which a pair of spiked pulses are produced at the leading and trailing edges of pulses of substantial width in the video signal and a single spiked pulse is produced by a very narrow pulse in the video signal, a bistable multivibrator circuit, means for applying said differentiated signal to said multivibrator circuit to switch the same from one stable state to the other as each spike is applied thereto, means for delaying the output of said pulse generator and for applying the delayed output to said multivibrator to reset the same to one of its two stable states, means for comparing the output of said multivibrator with the output of said pulse generator to produce pulses only upon coincidence of a pulse from said pulse generator with a pulse from said multivibrator, and apparatus responsive to the output of said comparing means for eliminating all spikes in said differentiated signal which occur during a sweep of the electron beam when a very narrow pulse appears in the video signal.

8. In a surface inspection system for material in which flaws have a different optical appearance than the remainder of the material, the combination of an electron-optics device for scanning an image of the surface of said material with an electron beam to produce a video signal in which a voltage pulse is generated each time the electron beam scans over the image of a flaw on said material, means including a pulse generator for causing said electron beam to sweep across the image of said material each time a pulse is produced by the generator, means responsive to said video signal for producing a differentiated signal in which a pair of spiked pulses are produced at the leading and trailing edges of pulses of substantial width in the video signal and a single spiked pulse is produced by a very narrow pulse in the video signal, and a device coupled to the output of said pulse generator for eliminating all spiked pulses in said differentiated signal which occur during a sweep of the electron beam when a very narrow pulse appears in the video signal.

9. The combination claimed in claim 8 and including apparatus responsive to the output of said device for producing pulses between successive pairs of the remaining spikes in said differentiated signal, and means for integrating the widths of the pulses produced by said apparatus.

10. In a surface inspection system for material in which flaws have a different optical appearance than the remainder of the material, the combination of an electron-optics device for scanning an image of the surface of said material with an electron beam to produce a video signal in which a voltage pulse is generated each time the electron beam scans over the image of a flaw on said material, means including a pulse generator for causing said electron beam to sweep across the image of said material each time a pulse is produced by the generator, means responsive to said video signal for producing a differentiated signal in which a pair of spiked pulses are produced at the leading and trailing edges of pulses of substantial width in the video signal and a single spiked pulse is produced by a very narrow pulse in the video signal, means for delaying the pulses produced by said pulse generator, a device for producing pulses between successive pairs of spikes occurring during each sweep of the electron beam and between the last of any odd numbered spikes occurring during said sweep and the leading edge of the following pulse in the delayed output of said pulse generator, means for comparing the undelayed output of said pulse generator with the pulses produced by said device to thereby produce a train of pulses in which a pulse occurs upon coincidence of a pulse at the output of pulse generator with a pulse produced by said device, circuit means for increasing the lengths of the pulses in said train, means for delaying said voltage spikes, and apparatus for gating the delayed voltage spikes with said pulses of increased length.

References Cited in the file of this patent

UNITED STATES PATENTS

| | | |
|---|---|---|
| 2,483,411 | Grieg | Oct. 4, 1949 |
| 2,484,352 | Miller et al. | Oct. 11, 1949 |
| 2,514,436 | Alvarez | July 11, 1950 |
| 2,659,823 | Vossberg | Nov. 17, 1953 |
| 2,742,151 | Milford | Apr. 17, 1956 |
| 2,798,605 | Richards | July 9, 1957 |
| 2,812,447 | MacMartin et al. | Nov. 5, 1957 |
| 2,868,059 | Summerhayes | Jan. 13, 1959 |